(No Model.)
J. L. THOMSON.
RIVET.
No. 481,123. Patented Aug. 16, 1892.
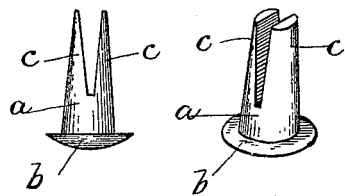
WITNESSES:
A. D. Harrison
P. A. McShane
INVENTOR:
Judson L. Thomson
by Wright Brown Crosley
Attys.

UNITED STATES PATENT OFFICE.

JUDSON L. THOMSON, OF WALTHAM, MASSACHUSETTS, ASSIGNOR TO THE JUDSON L. THOMSON MANUFACTURING COMPANY, OF SAME PLACE.

RIVET.

SPECIFICATION forming part of Letters Patent No. 481,123, dated August 16, 1892.

Application filed January 18, 1892. Serial No. 418,385. (No model.)

*To all whom it may concern:*

Be it known that I, JUDSON L. THOMSON, of Waltham, in the county of Middlesex and State of Massachusetts, have invented certain new and useful Improvements in Rivets for Boots or Shoes, of which the following is a specification.

This invention relates to rivets for boots or shoes, composed of a slotted tapered shank and a head, both formed in one piece, the shank being circular in cross-section from end to end and made largest at its inner end adjoining the head, the taper of the shank being gradual from its inner to its outer end. Heretofore rivets of this form have been slotted to convert a portion of the shank into clinching-prongs by forming a parallel-sided slot in the tapered shank, as shown in Letters Patent No. 304,862. It is found that in practice when the rivet is being inserted in the pieces of leather which it is to unite the pressure of the material on the tapered external sides of the prongs has a tendency to bend said prongs inwardly toward each other, and thus so contract the outer end of the slot separating said prongs as to make the clinching of the prongs a matter of some difficulty.

My invention has for its object to obviate this difficulty; and to this end it consists in providing the tapering shank with a correspondingly-tapering slot, which is widest at the outer end of the shank and gradually decreases toward its inner end, this form of slot preventing the inward bending of the prongs caused by the contact of the material with their external surfaces while the rivet is being inserted in the material.

In the accompanying drawings, forming part of this specification, Figure 1 represents a side view of my improved rivet. Fig. 2 represents a perspective view of the same.

The same letters of reference indicate the same parts in both the figures.

In the drawings, *a* represents the tapered shank, and *b* the head, of a rivet, the shank being circular in cross-section.

*c c* represent the prongs, which are formed by cutting a slot in the tapered shank. In carrying out my invention I give said slot a tapering form, it being widest at the outer end of the shank and gradually contracted in width toward the inner end of the shank.

When the shank is being driven into the leather, the pressure of the material on the tapered external surfaces of the prongs has a tendency to bend said prongs inwardly, as shown in dotted lines in Fig. 1, thus contracting the slot. It will be seen that the tapered form of the slot prevents such contraction, because the larger end of the slot receives so much of the leather into which the rivet is driven that said material acts as a wedge or filling, pressing outwardly against the sides of the slot and preventing the inward bending of the prongs.

It will be observed that by using a tapered shank which is circular in cross-section from end to end I give each prong formed by the slot in said shank a substantially semicircular outer surface and a flat inner surface. This form gives the prongs the necessary strength and freedom from liability to accidentally bend or cripple.

In Letters Patent No. 333,700, granted to me January 5, 1888, I show in Fig. 2 a rivet-shank having its external sides tapered inwardly from the head toward the point, and provided with a tapered slot which enlarges from the head toward the point. The outer sides of said rivets are flat, however, and not semicircular, as in the present case. I have found by long experience that rivet-prongs having flat exterior as well as flat interior surfaces are not sufficiently reliable and are liable to accidentally bend and cripple in a manner which seriously impairs their usefulness. I have therefore devised the rivet, which constitutes my present improvement, to overcome the objections inherent in the rivet shown in my former patent.

I am aware that a tapered rivet-shank which is circular in cross-section from end to end is not new, the same being shown in Patent No. 304,862, above mentioned; but in that patent the slot in the shank is of uniform width from end to end, so that when the shank is being inserted in the material the pressure of the material on the tapered exterior closes the mouth of the slot to an objectionable degree. It will be seen, therefore, that my present improvement overcomes all the objections which accompany all externally-tapered rivets heretofore known.

I claim—

The improved rivet for boots or shoes, composed of a head and a tapered or frusto-conical shank formed in one piece with the head and circular in cross-section and provided with a tapered slot which is widest at the outer end of the shank and has a flat surface at its inner end, each prong formed by the slot having a curved or substantially semicircular outer surface and a flat inner surface, the inner and outer tapered surfaces of the rivet being substantially equal in angle, whereby the points of the prongs are located centrally above the bases thereof, as and for the purposes set forth.

In testimony whereof I have signed my name to this specification, in the presence of two subscribing witnesses, this 13th day of January, A. D. 1892.

JUDSON L. THOMSON.

Witnesses:
C. F. BROWN,
A. D. HARRISON.